(12) United States Patent
Irisawa

(10) Patent No.: US 7,709,736 B2
(45) Date of Patent: May 4, 2010

(54) PROTECTOR FOR WIRE HARNESS

(75) Inventor: Takashi Irisawa, Yokkaichi (JP)

(73) Assignee: Sumitomo Wiring Systems, Ltd., Yokkaichi (JP)

(*) Notice: Subject to any disclaimer, the term of this patent is extended or adjusted under 35 U.S.C. 154(b) by 0 days.

(21) Appl. No.: 12/298,785

(22) PCT Filed: Dec. 14, 2006

(86) PCT No.: PCT/JP2006/324916

§ 371 (c)(1),
(2), (4) Date: Oct. 28, 2008

(87) PCT Pub. No.: WO2007/132544

PCT Pub. Date: Nov. 22, 2007

(65) Prior Publication Data
US 2009/0084578 A1 Apr. 2, 2009

(30) Foreign Application Priority Data
May 15, 2006 (JP) ............................. 2006-135613

(51) Int. Cl.
H02G 3/04 (2006.01)
(52) U.S. Cl. .................. 174/71 R; 174/72 A; 174/135
(58) Field of Classification Search ............. 174/74 A, 174/74 R, 75 F, 77 R, 84 R, 94 R, 89, 92, 174/152 G, 153 G, 151; 439/556, 559; 248/56; 16/2.1, 2.2
See application file for complete search history.

(56) References Cited

U.S. PATENT DOCUMENTS

| | | | | |
|---|---|---|---|---|
| 1,238,885 A | * | 9/1917 | Chmela | 174/92 |
| 3,711,633 A | * | 1/1973 | Ghirardi et al. | 174/135 |
| 4,478,252 A | * | 10/1984 | McLoughlin | 138/140 |
| 4,538,869 A | * | 9/1985 | Richards | 439/596 |
| 4,797,512 A | * | 1/1989 | Kumagai et al. | 174/135 |
| 6,226,937 B1 | * | 5/2001 | Carlton | 52/169.5 |
| 6,603,074 B2 | * | 8/2003 | Seo | 174/71 R |
| 6,875,918 B2 | * | 4/2005 | Sudo et al. | 174/363 |

(Continued)

FOREIGN PATENT DOCUMENTS

JP 62-115718 7/1987

(Continued)

OTHER PUBLICATIONS

English language Abstract of JP 2004-135436, Apr. 30, 2004.

(Continued)

Primary Examiner—William H Mayo, III
(74) Attorney, Agent, or Firm—Greenblum & Bernstein P.L.C.

(57) ABSTRACT

A resin-molded, annular protector for a wire harness for a vehicle includes a split pair of a main body and a lid body both having a semiannular shape, and split ends of the protector are joined and locked together. Lock holes are provided in a peripheral wall of the lid body by cutting portions of the inner peripheral side of the peripheral wall from the split ends, leaving engagement sections on the outer peripheral side of the lid body and opening the top ends of the cut portions in the outer peripheral surface of the lid body. Lock sections projecting from the inner peripheral side of the split ends are provided in the peripheral wall of the main body, at positions facing the lock holes.

8 Claims, 7 Drawing Sheets

U.S. PATENT DOCUMENTS

2005/0106934 A1  5/2005  Hatori
2005/0133247 A1  6/2005  Hatori

FOREIGN PATENT DOCUMENTS

| | | |
|---|---|---|
| JP | 2-97819 | 8/1990 |
| JP | 6-86425 | 3/1994 |
| JP | 11-8922 | 1/1999 |
| JP | 2004-135436 | 4/2004 |
| JP | 2004-229351 | 8/2004 |
| JP | 2004-229351 A * | 8/2004 |

OTHER PUBLICATIONS

English language Abstract of JP 11-8922, Jan. 12, 1999.
English language Abstract of JP 2004-229351, Aug. 12, 2004.
English language Abstract of JP 6-86425, Mar. 25, 1994.

* cited by examiner (A)

(B)

(A)

(B)

PROTECTOR FOR WIRE HARNESS

BACKGROUND OF THE INVENTION

1. Field of the Invention

The present invention relates to protectors for wire harnesses, and more particularly, the invention improves lock parts of a protector in which a main body and a lid body are joined and locked.

2. Description of Related Art

Conventionally, wire harnesses that are routed in vehicles are covered with resin-molded protectors in the required areas to protect the electrical wires of the wire harnesses from external interference materials and the like, and to regulate directions of the electrical wires. This type of protectors normally includes a main body and a lid body. The main body and the lid body are joined and locked while a wire harness is passed therethrough.

As an example of a lock structure of the above-described protectors, Japanese Patent Laid-open Publication H6-86425 (Related Art 1) discloses the lock structure of a protector 1 shown in FIG. 7. The protector 1 includes a main body 2 and a lid body 3 both having a semiannular shape. The main body 2 and the lid body 3 are connected via a thin-walled hinge part 4 at a first end side thereof, while a lock claw 5 that is provided in an outer surface of a second end side of the main body 2 engages with a lock frame 6 that is provided in an outer surface of the second end side of the lid body 3. Thereby, the main body 2 and the lid body 3 are joined and locked.

In the lock structure described in Related Art 1, the lock claw 5 projects from the outer surface of the main body 2, and the lock frame 6 from the outer surface of the lid body 3 of the protector 1. Therefore, when the main body 2 and the lid body 3 are joined and locked, the lock part projects from an outer peripheral surface of the protector 1 that is mounted to form an annular shape. Consequently, the protector 1 becomes bulky and could be unlocked when the lock part thereof interferes with external members. In addition, when a wire harness that is inserted through the protector 1 presses the lid body 3 to expand outwardly, the lock frame 6 is caused to bend outwardly. Consequently, the lock claw 5 possibly disengages from the lock frame 6.

Related Art 1: Japanese Patent Laid-open Publication H6-86425

A purpose of the present invention is to solve the above-described problems. In the present invention, lock parts of a protector do not project outwardly, and therefore the size of the protector is reduced. In addition, the lock parts are prevented from interfering with external members, and engagement force of the lock parts is improved.

SUMMARY OF THE INVENTION

In order to solve the above-described problems, the present invention provides a resin-molded, annular protector for mounting on a wire harness for a vehicle that includes a split pair of a main body and a lid body both having a semiannular shape. The main body and the lid body are connected via a thin-walled hinge part at first split ends thereof, and are joined and locked at second split ends thereof as an opening/closing part. Alternatively, the main body and the lid body are provided as separate bodies, and are joined and locked at the both split ends thereof. The lid body is provided with lock holes in a peripheral wall by cutting portions of an inner peripheral side of the peripheral wall from the split ends. The top ends of the cut portions are opened through an outer peripheral surface of the peripheral wall, while engagement parts are left on an outer peripheral side of the lid body. The main body is provided with lock sections that project from an inner peripheral side of the peripheral wall of the split ends, at positions facing the lock holes. The lock sections are provided with lock claws on an outer surface side of projecting tips thereof. The lock claws engage with the engagement parts of the lock holes from the inner peripheral side. When the main body and the lid body are joined and locked, the lock sections and the lock claws do not project from the outer peripheral surface of the peripheral wall of the lid body.

As described above, according to the protector of the present invention, the lock sections project along the inner peripheral side of the mating body. The main body, into which a wire harness is inserted first, is provided with the lock sections that project along an inner peripheral surface of the lid body. The reason for this is that, with the lid body having the lock sections therein, insertion of the lock sections into an inner surface side of the main body would be prevented by the wire harness in the main body.

According to the protector having the previously-described structure, the lock sections project from an inner peripheral surface, not from the outer peripheral surface of the main body. Therefore, the lock sections project to an inner peripheral surface side of the lid body. The lock sections are inserted into the lock holes in the lid body from an inner surface side, causing the lock claws at the lock section tips to engage with the engagement parts of the lock holes. Consequently, the main body and the lid body are joined and locked. At that time, the lock claws do not project from the outer peripheral surface of the lid body while engaging with the engagement parts. Since the lock claws do not interfere with external members, the protector is prevented from being unlocked when the lock claws are pressed by the external members. In addition, the size of the protector can be reduced. The lock sections are disposed along the inner peripheral surface of the lid body to cause the lock claws, which project on the outer surface side of the lock sections, to engage with the engagement parts of the lock holes. When the wire harness that is inserted into the protector presses the protector outwardly from inside, the lock sections are pressed against inner surface of the lid body, causing the lock claws of the lock sections to more firmly engage with the lock holes. Consequently, joining and locking force can be strengthened.

It is preferred that the above-described lock holes are provided by cutting portions of the inner peripheral part of the peripheral wall of the lid body in parallel to a diametrical direction. It is also preferred that the lock sections project from the inner peripheral part of the peripheral wall of the main body in parallel to the diametrical direction. Having the lock holes and the lock sections both in parallel to the diametrical direction improves matching accuracy of the lock hole direction and the lock section direction, allowing smooth insertion of the lock sections into the lock holes.

The wire harness that is inserted into the protector of the present invention is provided with a T-shaped branch part at which branch lines separate from main lines, the main and branch lines being passed through corrugated tubes. The protector is most preferably used to cover the T-shaped branch part of the wire harness. Conventionally, wires of the wire harness are often bound with tape for convergence and protection thereof. The tape binding requires skill and adds to workload. Presently, wires are often passed through corrugated tubes for convergence and protection thereof, the corrugated tubes being provided with crests and recesses alternatively in an axis direction for increased flexibility. However, with the corrugated tubes, the wires that are pulled out of the ends of the corrugated tubes are exposed at a branching point of the wire harness. Therefore, the branch part at which the wires are exposed is covered with the protector.

The T-shaped protector includes the main body and the lid body both having a horizontal shaft part for main lines and a vertical shaft part for branch lines. The horizontal shaft part and the vertical shaft part both have a semiannular shape and are connected to form a T-shape. The lock holes and the lock sections having the lock claws are provided on both sides in the direction of axis of the horizontal shaft parts for the main lines, and on both sides in a circumferential direction of an end portion of the vertical shaft parts for the branch lines. Thereby, the horizontal shaft parts for the main lines and the vertical shaft parts for the branch lines of the main body and of the lid body are respectively joined and locked.

Although the structure is complex in which the wire harness separates, the protector is not bulky, since, as described above, the lock parts do not project on an exterior of the protector. The main body and the lid body of the protector that is mounted on the T-shaped branch part are joined and locked multi-directionally. In this type of structure, lock parts tend to interfere with external members. However, the protector is prevented from being unlocked by having the joined and locked parts not projecting outwardly. The protector receives large press force from the wire harness therein when the wire harness is bent at the branch part. However, since the lock sections project to the inner surface side of the lid body, the lock sections do not lose engagement force when being pressed by the inner peripheral surface of the mating body. Therefore, the protector is reliably prevented from being unlocked.

The protector is not limited to use for T-shaped branch parts of wire harnesses. The protector can be mounted on either main lines or branch lines to regulate directions thereof or to protect them from external members, the main or branch lines being passed through corrugated tubes. In this case, the protector is a straight tube that includes a split pair of a main body and a lid body both having a semiannular shape. Fitting ribs are provided on both sides in a longitudinal direction of the semiannular parts to fit into the recesses of the corrugated tubes.

The protector for mounting on a wire harness that is passed through corrugated tubes is provided with the semiannular fitting ribs that project from the inner peripheral surface of the main body and of the lid body to fit into the recesses of the corrugated tubes. In addition, the lock sections projecting from the main body are provided with swelled parts on an inner surface side thereof. It is preferred that the swelled parts function as temporary fixing parts for the corrugated tubes by abutting the recesses of the corrugated tubes.

As described above, the main body is provided with the lock sections that project from edges thereof. In addition, the lock sections are provided with the swelled parts on the inner surface side thereof for fixing the corrugated tubes temporarily. As a wire harness is fitted into the main body while the lid body is still opened, the recesses of the corrugated tubes that cover the wire harness can be pressed and fixed by the swelled parts from an oblique upper direction. Thereby, the corrugated tubes can be prevented from coming out of the inside of the main body. In addition, when the main body and the lid body are joined and locked, operators do not need to hold the corrugated tubes in the main body to position and to fix the corrugated tubes therein. Consequently, the main body and the lid body can be easily joined and locked.

As described above, according to the protector of the present invention, the lock sections that project from the main body are provided along the inner peripheral side of the lid body. When the main body and the lid body are joined and locked, the lock sections do not project on the outer surface side of the lid body. Therefore, the size of the protector can be reduced. In addition, since the lock sections do not interfere with external members, the protector is prevented from being unlocked. Moreover, when the wire harness that is inserted into the protector presses the protector outwardly from inside, the lock sections are pressed against the inner surface of the lid body, causing the lock claws of the lock sections to more firmly engage with the lock holes. Consequently, joining and locking force can be strengthened.

BRIEF DESCRIPTION OF THE DRAWINGS

FIG. 3 (B) is a cross sectional view of a lid body;

FIG. 6 (B) is a cross sectional view of the protector according to the second embodiment of the present invention, in which the main body and the lid body are locked.

Figure 1:
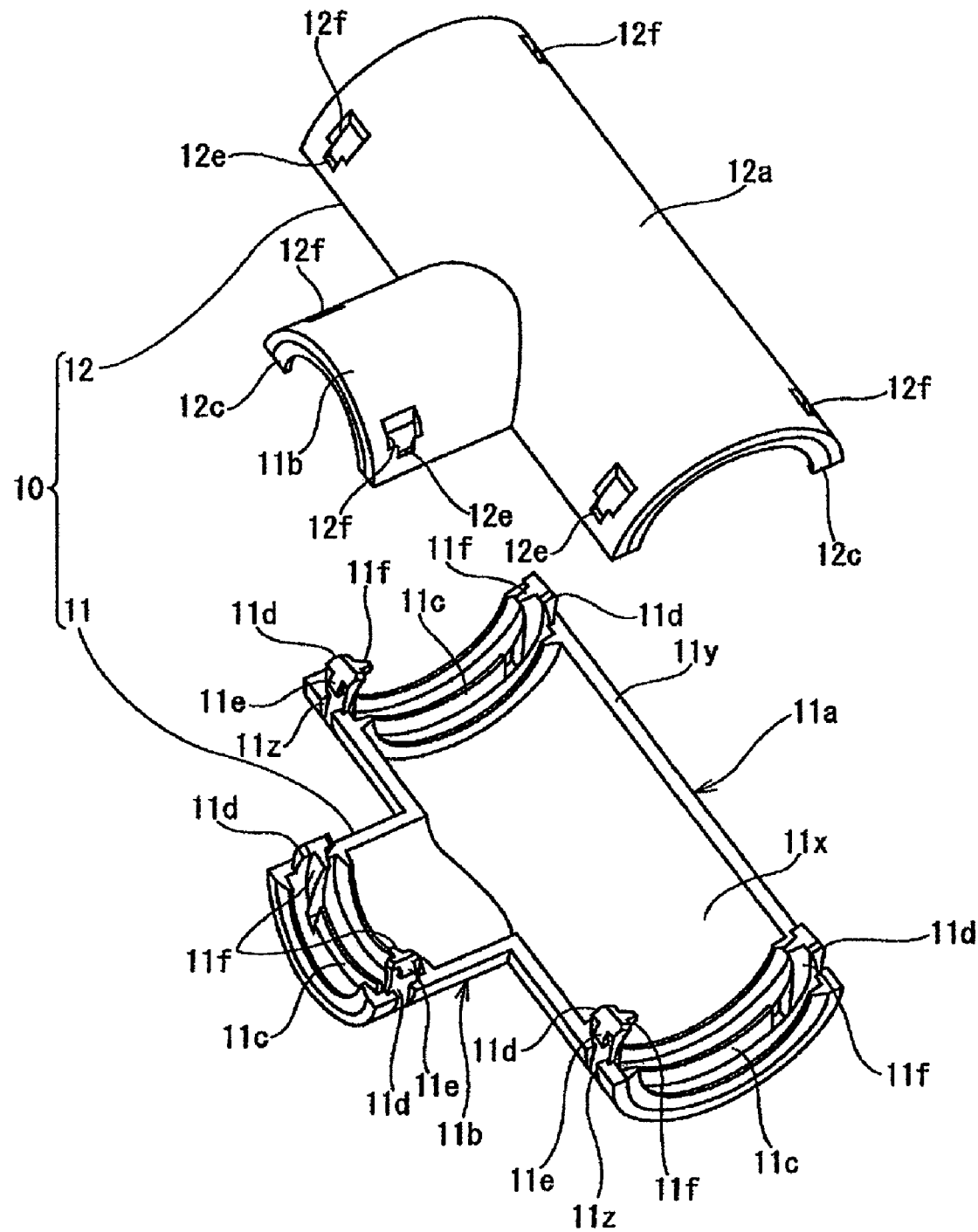
FIG. 1 is an exploded perspective view of a top surface side of a protector according to a first embodiment of the present invention.
Figure 2:
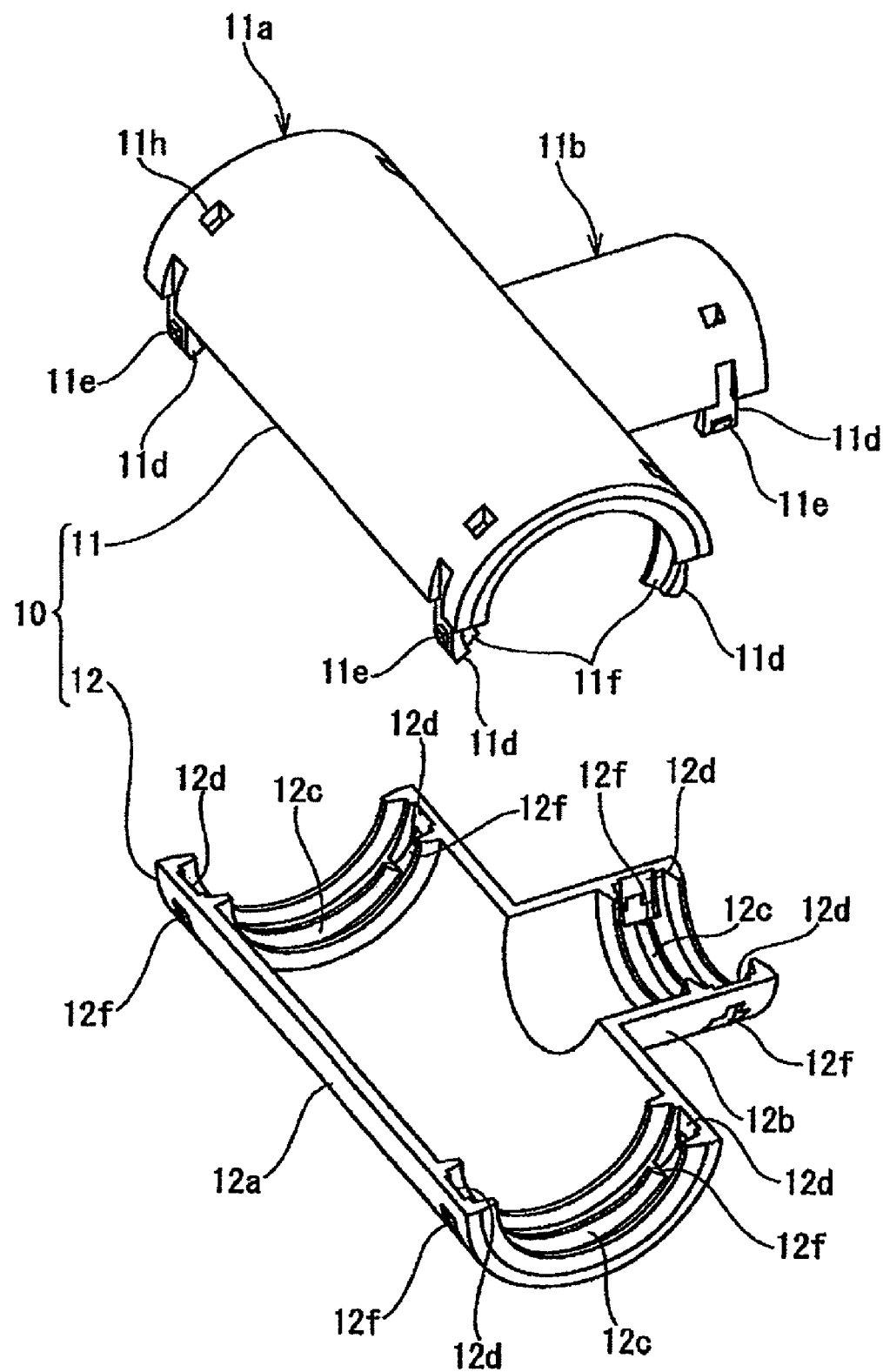
FIG. 2 is an exploded perspective view of a bottom surface side of the protector.

10 Protector
11 Main body
11a Horizontal shaft part for main lines
11b Vertical shaft part for branch lines
11c Fitting rib
11d Lock section
11e Lock claw
11f Swelled part
11x Peripheral wall
11y Split end
12 Lid body
12a Horizontal shaft part for main lines
12b Vertical shaft part for branch lines
12c Fitting rib
12d Cut portion
12e Lock hole
12x Peripheral wall
12y Split end
30, 31 Corrugated tube
W/H Wire harness
W/H1 Main line
W/H2 Branch line

DETAILED DESCRIPTION OF THE INVENTION

The present invention is described hereinafter in reference to the drawings. FIGS. 1 to 5 illustrate a protector 10 according to a first embodiment of the present invention. In the protector 10, branch lines W/H2 separate in a T shape from main lines W/H1 of a wire harness W/H. The main lines and the branch lines are passed through corrugated tubes 30 (30A and 30B) and 31. The protector 10 is mounted on a T-shaped branch part in which wires are pulled out of the corrugated tubes 30 and 31 and are exposed.

The protector 10 includes a main body 11 and a lid body 12 both having a T shape. As shown in FIG. 1, the main body 11 includes a horizontal shaft part 11a for the main lines and a vertical shaft part 11b for the branch lines, which are connected to form a T shape. The horizontal shaft part 11a for the main lines includes a semiannular part and is mounted on the main lines W/H1 of the wire harness W/H. The vertical shaft part 11b for the branch lines includes a semiannular part and orthogonally projects from a middle region in a direction of axis of the horizontal shaft part 11a for the main lines. Similarly, the lid body 12 includes a horizontal shaft part 12a for the main lines and a vertical shaft part 12b for the branch lines, which are connected to form a T shape. The horizontal shaft part 12a for the main lines includes a semiannular part. The vertical shaft part 12b for the branch lines includes a semiannular part and orthogonally projects from a middle region in a direction of axis of the horizontal shaft part 12a for the main lines.

The main body 11 is covered with the lid body 12 while the main lines and the branch lines, which are passed through the corrugated tubes 30 and 31, are fitted thereinto. Lock sections 11d that project from split ends of a peripheral wall 11x of the main body 11 is inserted into and engage with lock holes 12f that are bored through a peripheral wall 12x of the lid body 12, so as to join and lock the main body 11 and the lid body 12.

Specifically, the main body 11 is circumferentially provided with semiannular fitting ribs 11c projecting from an inner surface of both sides in the direction of axis of the horizontal shaft part 11a for the main lines and from an inner surface of an end portion of the vertical shaft part 11b for the branch lines. The fitting ribs 11c are fitted into recesses 30a and 30b of the corrugated tubes 30 and 31. Three fitting ribs are provided at each location at certain intervals in the axis direction. At the locations corresponding to the fitting ribs 11c that are middle ribs of the three fitting ribs, cut portions 11z are provided from both split ends 11y of the horizontal shaft part 11a for the main lines and of the vertical shaft part 11b for the branch lines. The lock sections 11d project from the cut portions.

Figure 3:
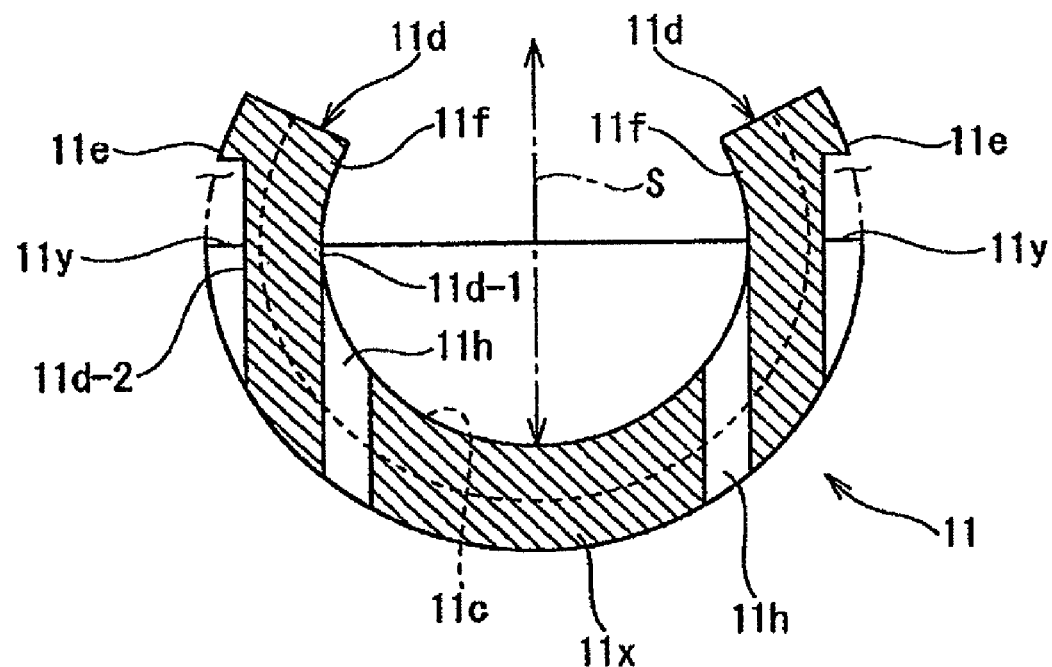
FIG. 3 (A) is a cross sectional view of a main body.
Figure 3:
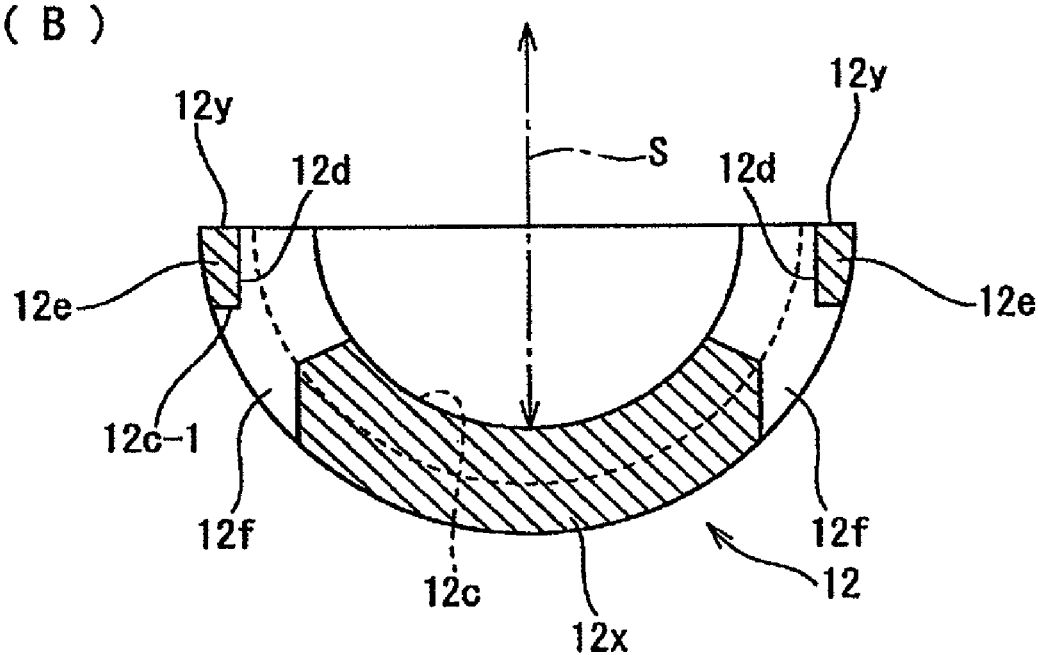

As shown in FIG. 3 (A), inner surfaces 11d-1 of the lock sections 11d are connected to inner peripheral ends, which abut the split ends, of the fitting ribs 11c. The lock sections 11d project in parallel to a diametrical direction S of the horizontal shaft part 11a for the main lines, which has a semiannular cross sectional view. In addition, the lock sections 11d project outwardly from the split ends 11y. Outer surfaces 11d-2 of the lock sections 11d do not project from an outer peripheral surface of the peripheral wall 11x, but project from an inner peripheral side of the split ends 11y of the peripheral wall 11x. The lock sections 11d are provided with lock claws 11e in a middle region of a projecting end side of outer surfaces 11d-1. Outer ends of the lock claws 11e do not project outwardly beyond virtual extension lines of the outer peripheral surface of the peripheral wall 11x. On the inner surfaces 11d-1 of the lock sections 11d, the portions that project from the split ends 11y curve to an inner surface side along virtual extension lines of the fitting ribs 11c. The lock sections 11d are provided with swelled parts 11f that project from the inner surface side of the lock sections 11d. These swelled parts 11f of the lock sections 11d that project from both of the split ends 11y are fitted into recesses of an upper exposed portion of the corrugated tubes 30 from an oblique upper direction, as the corrugated tubes 30 are fitted to the horizontal shaft part 11a for the main lines and to the vertical shaft part 11b for the branch lines. In FIG. 3 (A), holes 11h provided at a base side of the lock sections 11d are die cut holes to form the swelled parts 11f.

Meanwhile, similar to the main body 11, the lid body 12 of the protector 10 is provided with fitting ribs 12c circumferentially extending on an inner surface of both sides in the direction of axis of a horizontal shaft part 12a for the main lines and on an inner surface of an end portion of a vertical shaft part 12b for the branch lines. The fitting ribs 12c are fitted into the recesses 30a and 30b of the corrugated tubes 30 and 31. Three fitting ribs are provided at each location at certain intervals in the axis direction. At the locations of the fitting ribs 12c that are facing the lock sections 11d of the main body 11, the lock holes 12f are provided near both split ends 12y of the peripheral wall 12x of the lid body 12, the fitting ribs 12c being middle ribs of the three fitting ribs.

As shown in FIG. 3 (B), the lock holes 12f are provided by providing cut portions 12d from an inner peripheral side of the split ends 12y. The cut portions 12d are provided in parallel to a diametrical direction S of the horizontal shaft part 12a for the main lines and of the vertical shaft part 12b for the branch lines both having a semiannular shape. The cut portions 12d have top ends thereof opened in an outer peripheral surface of the peripheral wall 12x to form the lock holes 12f. At the split ends 12y, the cut portions 12d are provided at the inner peripheral side, with engagement parts 12e left on an outer peripheral side. Bottom end surfaces 12e-1 of the engagement parts 12e shown in FIG. 3 (B) function as fitting surfaces that engage with the lock claws 11e of the lock sections 11d.

Figure 4:
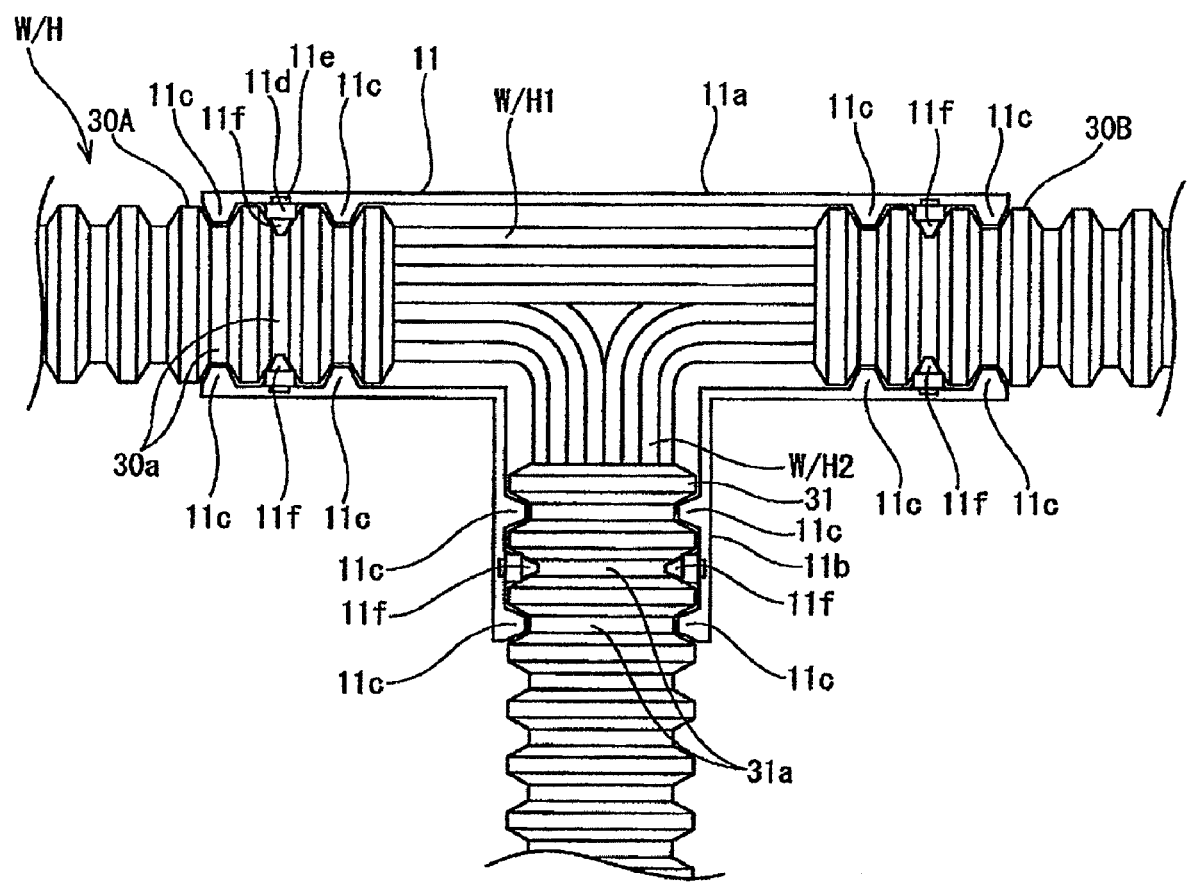
FIG. 4 illustrates the main body of the protector having a wire harness inserted thereinto.

Next, a mounting method of the protector 10 for the wire harness H/W is described. As shown in FIG. 4, the main lines W/H1 of the wire harness W/H, which are passed through the corrugated tubes 30A and 30B, are passed through the horizontal shaft part 11a for the main lines of the main body 11. The recesses 30a of the corrugated tubes 30 that are mounted on the main lines W/H1 are fitted to the fitting ribs 11c of the main body 11. At the same time, the recesses 30a of the corrugated tubes 30 are abutted on the swelled parts 11f of the main body 11. Then, the branch lines W/H2, which are passed through the corrugated tube 31, are passed through the vertical shaft part 11b for the branch lines of the main body 11. Then, the recesses 31a of the corrugated tube 31 that are mounted on the branch lines W/H2 are fitted to the fitting ribs 11c of the main body 11. At the same time, the recesses 31a of the corrugated tube 31 are abutted on the swelled parts 11f of the main body 11. At that time, the corrugated tubes 30 and 31, which are mounted on the wire harness W/H, are positioned in the axis direction by the fitting ribs 11c, and are abutted by the swelled parts 11f of the lock sections 11d from an oblique upper direction, the lock sections 11d projecting from both of the split ends 11y. The wire harness W/H is temporarily fixed to the main body 11, and is prevented from coming off before the lid body 12 is put on.

Figure 5:
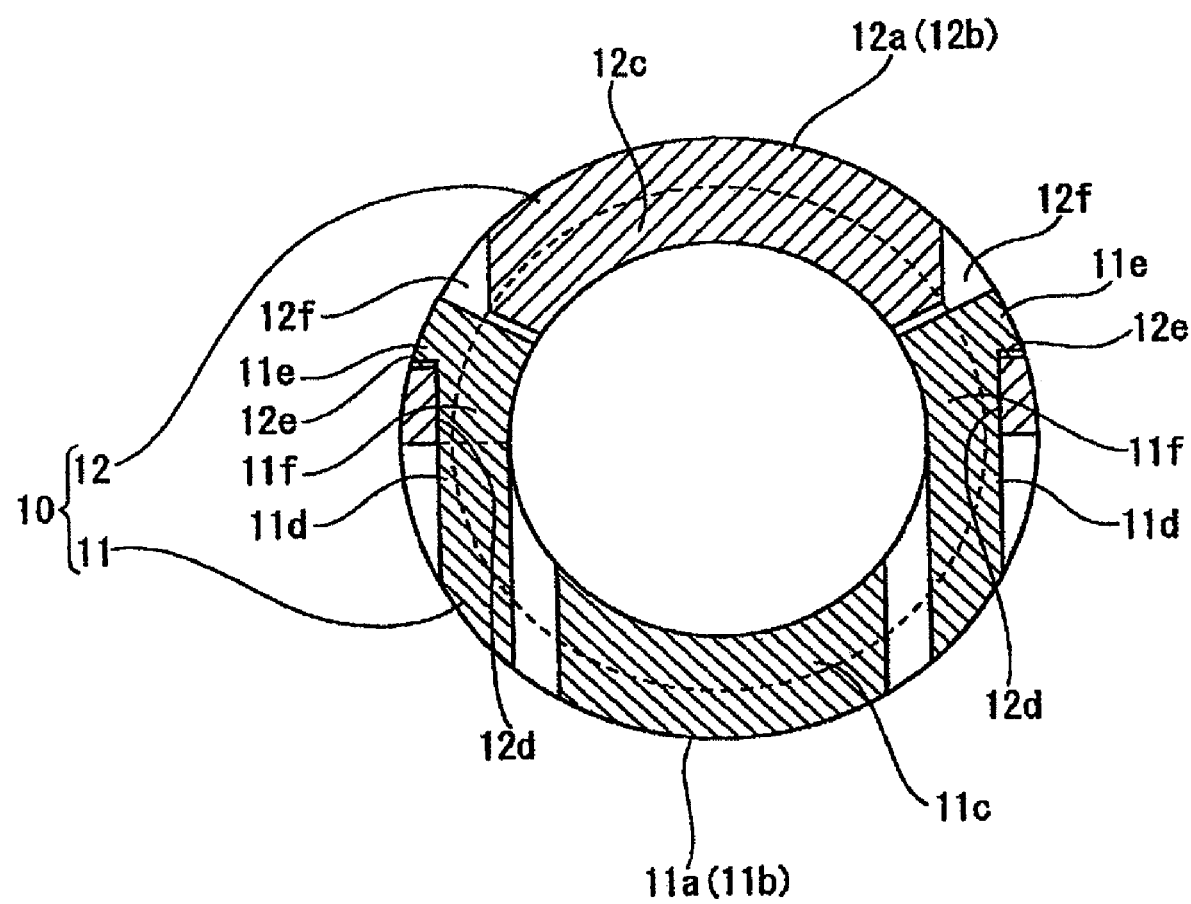
FIG. 5 is a cross sectional view of lock parts of the protector.

As shown in FIG. 5, the lid body 12 is put on the main body 11, and then the lock sections 11d of the main body 11 are inserted into the lock holes 12f from an inner surface side, along inner surfaces of the cut portions 12d of the lid body 12. Then, the lock claws 11e on outer surfaces of the lock sections 11d engage with the engagement parts 12e of the lock holes 12f. Thereby, the main body 11 and the lid body 12 are joined and locked to mount the protector 10 on the branch part of the wire harness W/H. In FIG. 5, the wire harness W/H and the corrugated tubes 30 and 31 are omitted.

According to the above-described structure, the lock sections lid that project from the main body 11 are provided along the inner surfaces of the cut portions 12d of the lid body 12. The lock claws 11e that project on the outer surfaces of the lock sections 11d do not project beyond a virtual outer peripheral surface that extends from the outer peripheral surface of the outer wall 11x of the main body 11 that has a semiannular shape. Therefore, when the main body 11 and the lid body 12 are joined and locked, the lock sections 11d and the lock claws 11e do not project on an outer surface side of the protector 10. Consequently, the size of the protector 10 can be reduced. In addition, since the lock sections 11d and the lock claws 11e do not interfere with external members, the protector 10 is prevented from being unlocked. Moreover, when the wire harness W/H that is inserted into the protector 10 presses the protector 10 to expand outwardly from inside, the lock sections 11d, that are provided on the main body 11, are pressed against an inner surface of the lid body 12, causing the lock claws 11e of the lock sections 11d to more firmly engage with the engagement parts 12e. Consequently, joining and locking force can be strengthened.

Furthermore, as end portions of the corrugated tubes 30 and 31 that are mounted on the wire harness W/H are inserted into the main body 11 of the protector 10, the fitting ribs 11c of the main body 11 are fitted into the recesses 30a and 31a of the corrugated tubes 30 and 31, causing the corrugated tubes 30 and 31 to be positioned in the axis direction. The swelled parts 11f of the lock sections 11d of the main body 11 are abutted on the recesses 30a and 31a of the corrugated tubes 30 and 31 from an oblique upper direction. Thereby, the corrugated tubes 30 and 31 are prevented from coming out of the inside of the main body 11. In addition, when the main body 11 and the lid body 12 are joined and locked, operators do not need to hold the corrugated tubes 30 and 31 in the main body 11 to position and to fix the corrugated tubes 30 and 31 therein. Consequently, the main body 11 and the lid body 12 can be easily joined and locked.

Figure 6:
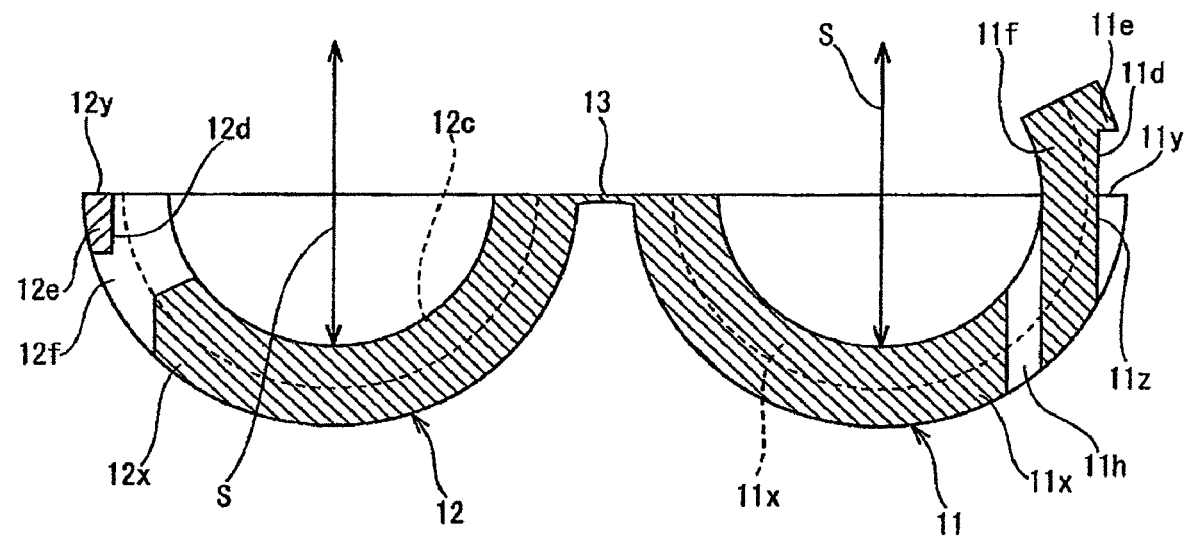
FIG. 6 (A) is a cross sectional view of a protector according to a second embodiment of the present invention, in which a main body and a lid body are opened.
Figure 6:
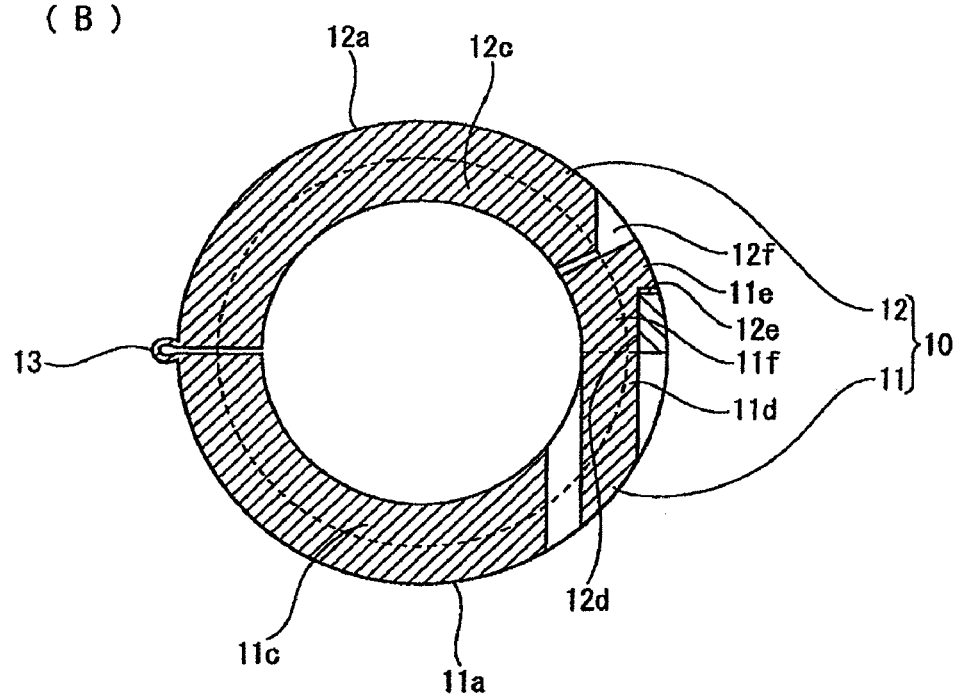
Figure 7:
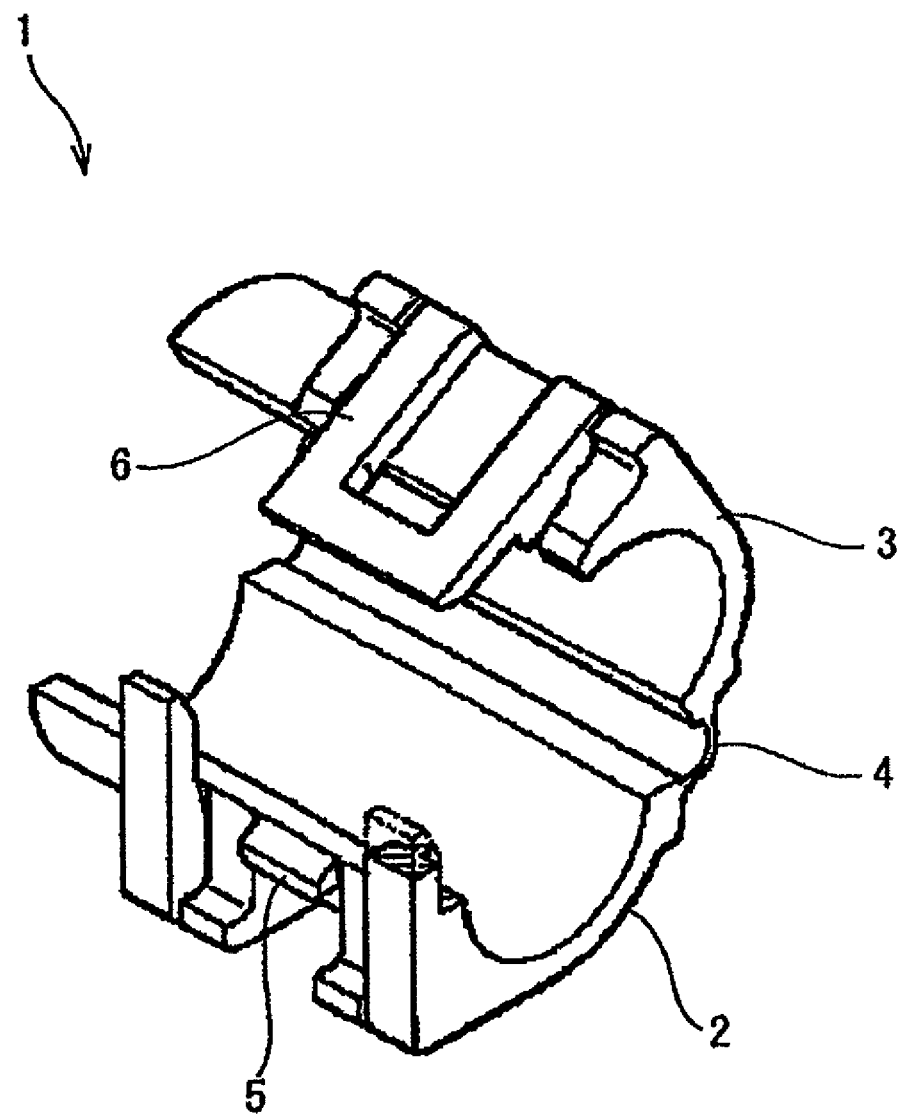
FIG. 7 illustrates an example of conventional technology.

FIG. 6 (A) and FIG. 6 (B) illustrate a second embodiment of the present invention. In this embodiment, a main body 11 and a lid body 12 of a protector 10 are not separate bodies. The main body 11 and the lid body 12 are connected via a thin-walled hinge part 13 at a first end side of horizontal shaft parts 11a and 12a for main lines to be one body. Similar to those in the first embodiment, the main body 11 and the lid body 12 are provided with lock sections 11d and lock holes 12f, but only on a second end side of the horizontal shaft parts 11a and 12a for the main lines of the main body 11 and the lid body 12. The lock sections 11d having lock claws 11e project from split ends 11y of the main body 11. The lock holes 12f are provided near split ends 12y of the lid body 12. Otherwise, the configurations and effects are the same as those in the first embodiment, therefore the same symbols are used and an explanation thereof is omitted.

What is claimed is:

1. A resin-molded, annular protector for mounting on a wire harness for a vehicle, comprising one of:
    a split pair of a semiannular main body and a semiannular lid body that are connected via a thin-walled hinge part at first split ends thereof, and that are joined and locked at second split ends thereof as an opening/closing part, and
    a split pair of a semiannular main body and a semiannular lid body that are joined and locked at both split ends thereof, as separate bodies, wherein
    the lid body is provided with lock holes in a peripheral wall by cutting portions of an inner peripheral side of the peripheral wall from the split ends, leaving engagement parts on an outer peripheral side, and opening top ends of the cut portions in an outer peripheral surface;
    the main body is provided in a peripheral wall with lock sections that project outwardly from an inner peripheral side of the split ends, at positions facing the lock holes;
    the lock sections are provided with lock claws on an outer surface side of projecting tips thereof, the lock claws engaging with the engagement parts of the lock holes from the inner peripheral side; and
    when the main body and the lid body are joined and locked, the lock sections and the lock claws do not project from the outer peripheral surface of the peripheral wall of the lid body.

2. The protector for mounting on a wire harness according to claim 1, wherein the lock holes are provided by cutting portions of the inner periphery of the peripheral wall in parallel to a diametrical direction, and the lock sections project from the inner periphery of the peripheral wall in parallel to the diametrical direction.

3. The protector for mounting on a wire harness according to claim 2, wherein
    the wire harness covered with the protector is passed through corrugated tubes that are provided with crests and recesses alternatively in an axis direction;
    the main body and the lid body are provided with semiannular fitting ribs projecting from the inner peripheral side thereof, the fitting ribs being fitted into the recesses of the corrugated tubes; and
    the lock sections projecting from the main body are provided with swelled parts at an inner surface side thereof, the swelled parts functioning as temporary fixing parts for the corrugated tubes by abutting the recesses of the corrugated tubes.

4. The protector for mounting on a wire harness according to claim 3, wherein
    the wire harness is provided with a T-shaped branch part at which branch lines separate from main lines that are respectively passed through the corrugated tubes, the T-shaped branch part being covered with the protector;
    the main body and the lid body are both provided with a horizontal shaft part for the main lines and a vertical shaft part for the branch lines to form a T-shape, the horizontal shaft part and the vertical shaft part both having a semiannular shape; and
    the lock holes and the lock sections having the lock claws are provided on both sides in a direction of axis of the horizontal shaft parts for the main lines and on both sides in a circumferential direction of the vertical shaft parts for the branch lines at an end portion side, so as to respectively join and lock the horizontal shaft parts for the main lines and the vertical shaft parts for the branch lines.

5. The protector for mounting on a wire harness according to claim 2, wherein
    the wire harness is provided with a T-shaped branch part at which branch lines separate from main lines that are respectively passed through the corrugated tubes, the T-shaped branch part being covered with the protector;
    the main body and the lid body are both provided with a horizontal shaft part for the main lines and a vertical shaft part for the branch lines to form a T-shape, the horizontal shaft part and the vertical shaft part both having a semiannular shape; and
    the lock holes and the lock sections having the lock claws are provided on both sides in a direction of axis of the horizontal shaft parts for the main lines and on both sides in a circumferential direction of the vertical shaft parts for the branch lines at an end portion side, so as to respectively join and lock the horizontal shaft parts for the main lines and the vertical shaft parts for the branch lines.

6. The protector for mounting on a wire harness according to claim 1, wherein
the wire harness covered with the protector is passed through corrugated tubes that are provided with crests and recesses alternatively in an axis direction;
the main body and the lid body are provided with semiannular fitting ribs projecting from the inner peripheral side thereof, the fitting ribs being fitted into the recesses of the corrugated tubes; and
the lock sections projecting from the main body are provided with swelled parts at an inner surface side thereof, the swelled parts functioning as temporary fixing parts for the corrugated tubes by abutting the recesses of the corrugated tubes.

7. The protector for mounting on a wire harness according to claim 6, wherein
the wire harness is provided with a T-shaped branch part at which branch lines separate from main lines that are respectively passed through the corrugated tubes, the T-shaped branch part being covered with the protector;
the main body and the lid body are both provided with a horizontal shaft part for the main lines and a vertical shaft part for the branch lines to form a T-shape, the horizontal shaft part and the vertical shaft part both having a semiannular shape; and
the lock holes and the lock sections having the lock claws are provided on both sides in a direction of axis of the horizontal shaft parts for the main lines and on both sides in a circumferential direction of the vertical shaft parts for the branch lines at an end portion side, so as to respectively join and lock the horizontal shaft parts for the main lines and the vertical shaft parts for the branch lines.

8. The protector for mounting on a wire harness according to claim 1, wherein
the wire harness is provided with a T-shaped branch part at which branch lines separate from main lines that are respectively passed through the corrugated tubes, the T-shaped branch part being covered with the protector;
the main body and the lid body are both provided with a horizontal shaft part for the main lines and a vertical shaft part for the branch lines to form a T-shape, the horizontal shaft part and the vertical shaft part both having a semiannular shape; and
the lock holes and the lock sections having the lock claws are provided on both sides in a direction of axis of the horizontal shaft parts for the main lines and on both sides in a circumferential direction of the vertical shaft parts for the branch lines at an end portion side, so as to respectively join and lock the horizontal shaft parts for the main lines and the vertical shaft parts for the branch lines.

* * * * *